United States Patent Office 3,523,116
Patented Aug. 4, 1970

3,523,116
METHOD OF PRODUCING 1,2-DIHYDRO-
3H-1,4-BENZODIAZEPIN-2-ONES
Pasquale Domenico Sorrentino, Kastrup, Denmark, assignor to A/S Dumex (Dumex Ltd.), Copenhagen, Denmark, a firm
No Drawing. Filed Nov. 15, 1967, Ser. No. 683,106
Claims priority, application Denmark, Nov. 23, 1966, 6,057/66
Int. Cl. C07d 53/06
U.S. Cl. 260—239.3
2 Claims

ABSTRACT OF THE DISCLOSURE

This invention relates to a method of producing 1,2-dihydro-3H-1,4-benzodiazepin-2-ones in which a dihaloacetamino-benzhydryl phthalimide is reacted with an alkali metal alkoxide in alcoholic solution.

This invention relates to a novel method of producing 1,2 - dihydro - 3H - 1,4 - benzodiazepin - 2 - ones of the formula:

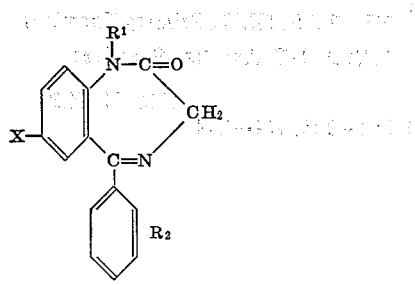

wherein X is hydrogen, halogen, a trifluoromethyl group, or a nitro group, $R^1$ is an alkyl group of not more than 6 carbon atoms, and $R^2$ is hydrogen, halogen, a trifluoromethyl group, or an alkyl or alkoxy group of not more than 6 carbon atoms. The compounds of this formula are known compounds having a sedative, muscle relaxant, and anticonvulsive effect.

It has surprisingly been found that the said compounds can be produced in a satisfying yield by reacting a dihaloacetaminobenzhydryl phthalimide of the formula:

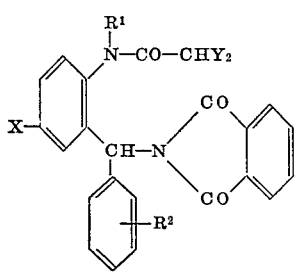

wherein X, $R^1$, and $R^2$ are as hereinbefore defined, and Y is halogen, with an alkali metal alkoxide in alcoholic solution.

The reaction is supposed to proceed according to the following scheme of reaction:

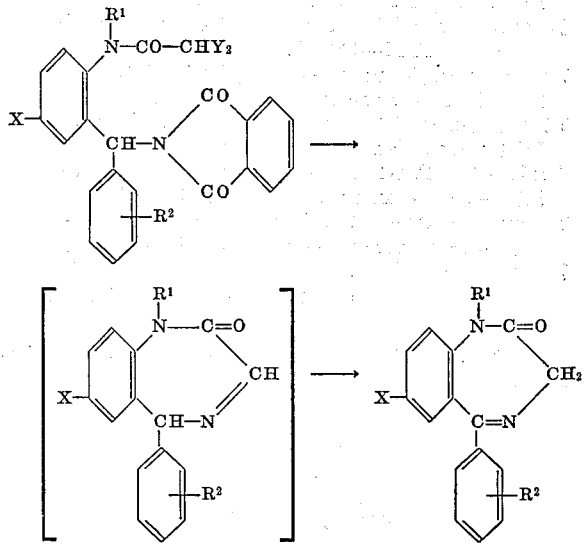

but it has not hitherto been possible to isolate the intermediate in brackets.

The starting materials are hitherto unknown products which can be produced by reacting the corresponding aminobenzhydryl amine with phthalic acid anhydride- or aminobenzhydryl chloride with potassium phthalimide-, and reacting the resulting phthalimide with, for example, dichloracetyl chloride.

The method of the invention is illustrated by the following example:

A suspension of 10 g. of 2-dichlor-acetyl-methyl-amino-5-chlorbenzhydryl phthalimide in 200 ml. of ethanol are refluxed for 2½ hours with a solution of 4.65 g. of sodium ethoxide in 100 ml. of ethanol. The reaction mixture is then cooled, and poured into 500 ml. of ice-water, the pH being adjusted to 7–7.5.

After evaporation in vacuo to half its volume, the reaction mixture is extracted with methylene chloride, and the organic phase is washed first with a 1 N aqueous solution of sodium carbonate, and then with water, after which it is dried over sodium sulphate, and the solvent is distilled off.

The yield is 2.8 g. of crude 7-chloro-1-methyl-5-phenyl-1,2-dihydro-3H-1,4 - benzodiazepin - 2 - one, which after recrystallisation from isopropanol melts at 128–130° C.

To produce the starting material, a mixture of 33 g. of 2-methylamino-5-chlorbenzhydryl amine and 19.8 g. of phthalic acid anhydride is heated to 180–185° C. for 15 minutes, after which the resulting melted mass is cooled, and recrystallized from ethanol, yielding 34.5 g. of 2-methylamino-5-chlorbenzhydryl phthalimide with melting point 191.2–191.9° C.

Calc'd for $C_{22}H_{17}O_2N_2Cl$ (percent): C, 70.2; H, 4.55; N, 7.44; Cl, 9.40. Found (percent): C, 69.97; H, 4.46; N, 7.42; Cl, 9.30.

To a cooled solution of 21 g. of the said phthalimide in 260 ml. of benzene are added 18 g. of dichloracetyl chloride, and simultaneously a 2 N aqueous solution of sodium hydroxyde at a rate to keep the temperature in the reaction mixture between 5 and 10° C., and the pH slightly above 7. The organic phase is then separated, washed with water, dried over sodium sulphate, and concentrated to 80 ml. Then, 80 ml. of hexane are added, and the mixture is stirred for one hour at 10° C. The thus precipitated crystals are filtered off and dried, yielding 25 g. of 2 - dichloracetyl - methylamino - 5 - chlorbenzhydryl phthalimide with melting point 206–207° C. A nitrogen test according to Kjeldahl gave 5.59% as against the theoretical 5.74%.

In analogous manner, the following compounds can be prepared:

7-chloro-1-ethyl-5-phenyl-1,2-dihydro-3H-1,4-benzodiazepin-2-one of M.P. 127–128° C.
1-methyl-5-phenyl-1,2-dihydro-3H-1,4-benzodiazepin-2-one of M.P. 154–155° C.
7-nitro-1-methyl-5-phenyl-1,2-dihydro-3H-1,4-benzodiazepin-2-one of M.P. 156–157° C.
7-bromo-1-methyl-5-(2'-fluorophenyl)-1,2-dihydro-3H-1,4-benzodiazepin-2-one of M.P. 132° C.
7-chloro-1-methyl-5-(2'-methylphenyl)-1,2-dihydro-3H-1,4-benzodiazepin-2-one of M.P. 138° C.
7-chloro-1-methyl-5-(2'-chlorophenyl)-1,2-dihydro-3H-1,4-benzodiazepin-2-one of M.P. 137–138° C.
7-chloro-1-methyl-5-(2'-methoxyphenyl)-1,2-dihydro-3H-1,4-benzodiazepin-2-one of M.P. 161–161.5° C.

I claim:
1. The method of producing compounds of the formula:

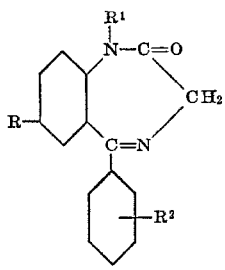

wherein X is hydrogen, halogen, trifluoromethyl or nitro; $R^1$ is alkyl of from one to six carbon atoms; and $R^2$ is hydrogen, halogen, trifluoromethyl, alkyl of from one to six carbon atoms, or alkoxy of from one to six carbon atoms; which comprises reacting a compound of the formula

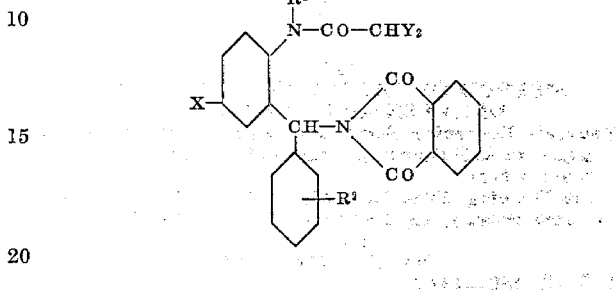

wherein X, $R^1$ and $R^2$ are as hereinbefore defined and Y is halogen, with an alkali metal alkoxide in an alcohol solution.

2. The method of claim 1, in which 2-dichloracetyl-methylamino-5-chlorbenzhydryl phthalimide is refluxed with an ethanolic solution of sodium ethoxide.

References Cited

UNITED STATES PATENTS 3,371,085  2/1968  Reeder et al. _____ 260—239.3

HENRY R. JILES, Primary Examiner

R. T. BOND, Assistant Examiner

U.S. Cl. X.R.
260—326; 424—244